United States Patent [19]

Mori et al.

[11] Patent Number: 4,538,216
[45] Date of Patent: Aug. 27, 1985

[54] LIGHTING APPARATUS

[75] Inventors: Leo Mori; Mamoru Tominaga, both of Yokohama; Takashi Aoba, Ageo, all of Japan

[73] Assignee: Tokyo Shibaura Denki Kabushiki Kaisha, Kawasaki, Japan

[21] Appl. No.: 400,477

[22] Filed: Jul. 21, 1982

[30] Foreign Application Priority Data

Jul. 28, 1981 [JP] Japan .................. 56-118191

[51] Int. Cl.$^3$ .............................................. F21V 3/00
[52] U.S. Cl. ................................... 362/311; 362/309; 362/310; 362/328; 362/329; 362/333; 362/334; 362/335; 362/339; 362/340; 362/375
[58] Field of Search ............... 362/333, 335, 311, 309, 362/310, 328, 329, 334, 339, 340, 375

[56] References Cited

U.S. PATENT DOCUMENTS

| | | | |
|---|---|---|---|
| 1,211,447 | 1/1917 | Houze | 362/333 |
| 1,250,669 | 12/1917 | Sailer et al. | 362/333 |
| 1,317,872 | 10/1919 | Griswold | 362/333 |
| 1,489,697 | 4/1924 | Carson | 362/333 |
| 2,220,639 | 11/1940 | Borsarelli | 362/333 |
| 4,165,154 | 8/1979 | Takahashi | 350/128 |
| 4,373,178 | 2/1983 | Gulliksen | 362/335 |

FOREIGN PATENT DOCUMENTS

| | | |
|---|---|---|
| 2607415 | 2/1976 | Fed. Rep. of Germany . |
| 2929971 | 7/1979 | Fed. Rep. of Germany . |
| 2404270 | 9/1977 | France . |
| 48-77830 | 10/1973 | Japan . |
| 51-100723 | 9/1976 | Japan . |

OTHER PUBLICATIONS

Applied Optics, vol. 12, No. 2 (Feb. 1973), D. R. Buchele, "Lens Projection System for Solar Simulator Providing Irradiance of 100 Solar Constants," pp. 355-358.

Primary Examiner—Stephen J. Lechert, Jr.
Attorney, Agent, or Firm—Oblon, Fisher, Spivak, McClelland & Maier

[57] ABSTRACT

An lighting apparatus including a housing having an opening, a light source received in the housing and a light transmitting-cover fixed at the opening of the housing and through which light rays are projected from the light source. The light transmitting-cover includes a plate made of light transmitting-material and having a first surface and a second surface. Segment lens elements of the same size are arranged on the first and second surface of the plate and formed integrally with the plate. The segment lens elements on the first surface are positioned in face-to-face relation with the segment lens elements arranged on the second surface, thus forming a segment lens. The segment lens elements have a common optical axis and convex surfaces, respectively. The focal lengths defined by these convex surfaces are equal. The focal point of one of the segment lens elements lies on the convex surface of the other segment lens element, and the focal point of the other segment lens element lies on the convex surface of the other segment lens element.

12 Claims, 18 Drawing Figures

LIGHTING APPARATUS

BACKGROUND OF THE INVENTION

1. Field of the Invention

The present invention relates to a lighting apparatus provided with a light transmitting-cover or plate for diffusing light rays emitted from a light source.

2. Description of the Prior Art

As well known, there is a lighting apparatus of the type in which the light rays emitted from a light source, such as an incandescent lamp, a low pressure discharge lamp and a high pressure discharge lamp, are diffused through a light transmitting-cover or plate. A lighting apparatus of this type has been used for indoor and outdoor illumination and advertising display purposes. In a lighting apparatus using a combination of the light source and the light transmitting-plate, the light transmitting-plate protects the light source, keeps the light source from sight, and diffuses the light emitted from the light source. In some lighting apparatuses used for the advertising display, the outer surface of the light transmitting-plate is used for the display surface.

In the lighting apparatus, light incident on the light transmitting-plate contains direct light rays directly emitted from the light source, and light rays which are reflected from the inner surface of the lighting apparatus. Thus, direct and reflected light rays are incident upon the light transmitting-plate at various incident angles. The light source, such as an incandescent lamp, a low pressure discharge lamp, and a high pressure discharge lamp, generally have a non-uniformity of luminance and color depending on the direction against light axis. The light emitted from its light emitting section is generally far from uniform in luminance and color. When the light rays emitted from the light source with such characteristics are incident on the light transmitting-plate, the irregularity of illumination and color appears on the light emitting surface of the light transmitting-plate and the surface illuminated by the lighting apparatus of this type.

To solve such problems of the prior lighting apparatus, the light transmitting-plate has been modified variously. For example, a diffusing plate or a refracting plate has been proposed, as the light transmitting-plate, for example, a frosted glass, an opaque plate or a cover with its one surface having a spherical lens or a prism structure.

Figure 1:
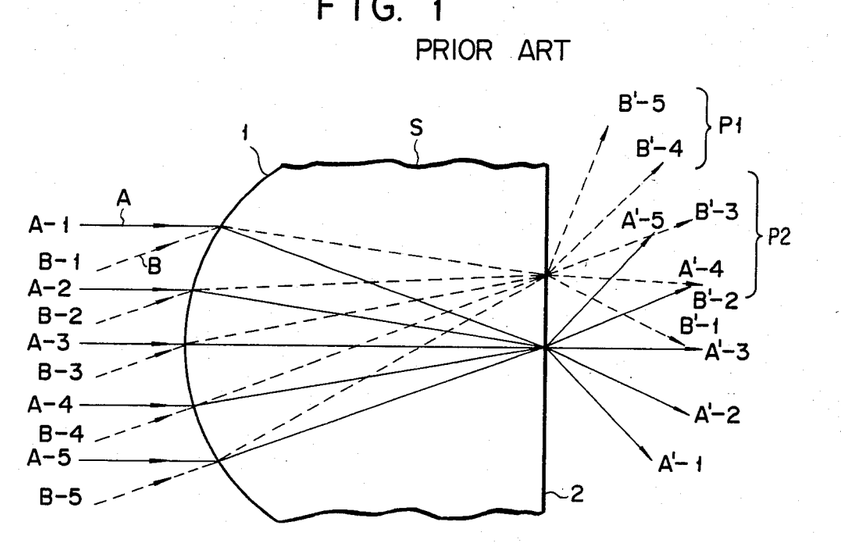
FIG. 1 shows a lens segment of a prior light transmitting-cover and optical paths of the light rays passing through the lens segment.
Figure 2:
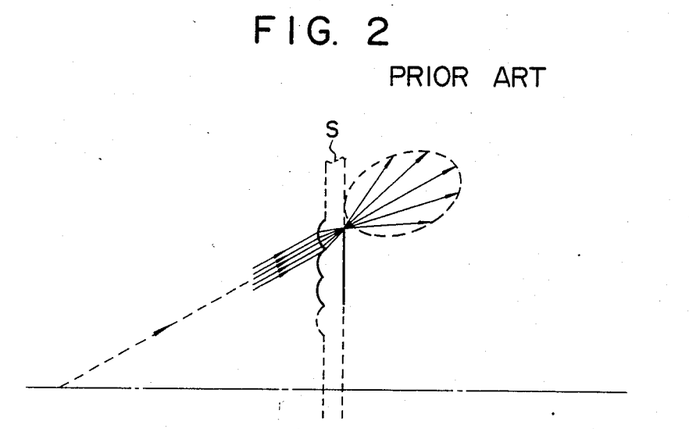
FIG. 2 shows a distribution of light rays on a prior light transmitting-cover.

In the lighting apparatus of the type using the diffusing plate shown in FIG. 1, even if the light source has a poor luminance distribution and a poor uniformity of color, the luminance distribution and color uniformity may be improved on the illuminated surface to some extent, but not completely. The diffusing plates of the lighting apparatus of the type is provided with spherical lens segments on one surface thereof. Light rays A (A-1 to A-5) and light rays B (B-1 to B-5) as indicated by solid and broken lines are incident on a convex surface 1 of the lens segment at different angles and these light rays are emitted from a flat surface 2. In this case, the light rays A (A-1 to A-5) and B (B-1 to B-5) are transmitted through the lens segment, while being refracted as shown. As seen from the figure, the light rays A and B emitted from the flat surface 2 have different center lines in their spread angles. In this situation, if there is an intensity difference or a color difference between the light rays A and B, the intensities or the colors of light rays A' and B' projected from the flat surface 2 are different to each other in areas P1 and P2. In the lighting apparatus using optical refractors with the spherical lens segment elements on one surface, when the light rays from the light source are incident at a certain angle on the refractor, an intensity distribution of the transmitted light rays has its peak in the incident direction, as shown in FIG. 2. Therefore, the light intensity on the illuminated surface is maximized at an area to which the incident light rays are directed. This indicates that there occurs a non-uniformity in the illuminance distribution over the illuminated surface. While the above description relates to the general type of the lighting apparatus, the same thing is true for the display surface for the advertising display. Also in this case, the poor illuminance distribution and poor color balance appear on the light emitting surface of the optical refractor as the display surface. The same problem arises also in the lighting apparatus having a plurality of light sources.

SUMMARY OF THE INVENTION

Accordingly, an object of the present invention is to provide a lighting apparatus with a light transmitting-cover which can make a uniform light intensity distribution and a uniformity of color balance on the light emitting surface of the light transmitting-cover, even if the apparatus is used in combination with a light source having a poor luminance distribution and a poor color uniformity, and therefore can make a uniform light intensity distribution and a uniformity of color balance on the illuminated surface of the light transmitting-cover.

According to the present invention, there is provided a lighting apparatus having a light transmitting-cover through which light rays are projected. The light transmitting-cover comprises a plate made of light transmitting-material and having first and second surfaces, a plurality of first segment lens elements for receiving light rays, and a plurality of second segment lens elements for diffusing the light rays. The first segment lens elements are integrally formed with the plate and arranged on the first surface of the plate. The second segment lens elements are integrally formed with the plate and arranged on the second surface, in face-to-face relation with the first segment lens element, respectively, thus forming a plurality of segment lenses. The first and second segment lens elements have a common optical axis and convex surfaces. They have substantially equal focal lengths so that the focal point of the first segment lens element lies on the convex surface of the second segment lens element and the focal point of the second segment lens element lies on the convex surface of the first segment lens element.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 3:
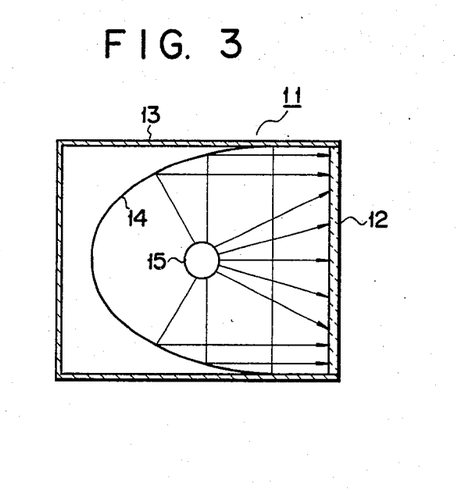
FIG. 3 shows a cross sectional view of an embodiment of a lighting apparatus according to the present invention.

Referring to FIG. 3 schematically illustrating a lighting apparatus according to the present invention which is used for general illumination purposes, the lighting apparatus is comprised of a light source 11 and a light transmitting-cover 12 for refracting and diffusing the light rays emitted from the light source 11.

Figure 4:
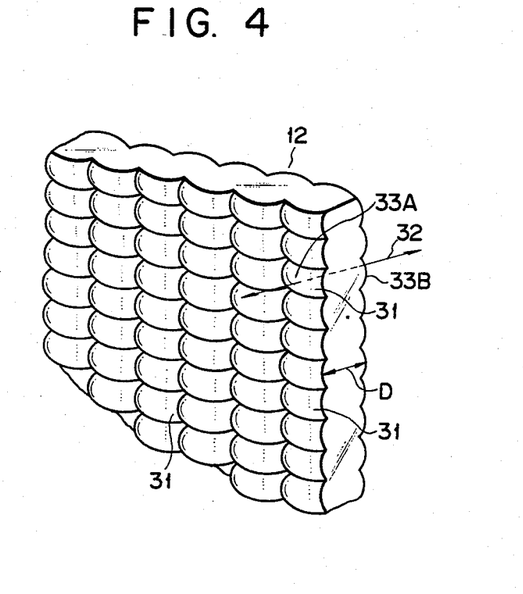
FIG. 4 shows a perspective view of a part of the light transmitting-cover shown in FIG. 3.
Figure 5:
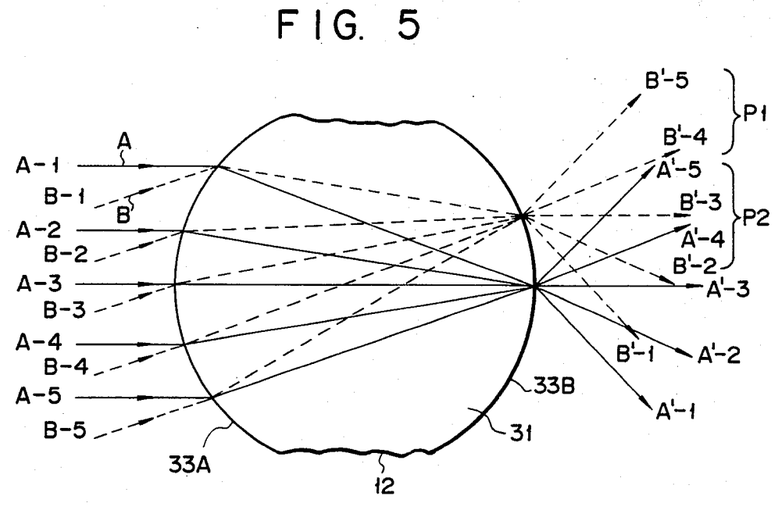
FIG. 5 illustrates a lens segment of a light transmitting-cover shown in FIG. 4 and optical paths of the light rays passing through the lens segment.

The light source apparatus 11 is comprised of an housing 13 opening at one side, a parabolic mirror 14 with a parabolic surface set with its opening toward the opening of the housing 13, and a light source 15, for example, an incandescent lamp disposed within the mirror 14. In the figure, a cord and a radiator are omitted for simplicity. A light transmitting-cover 12 for covering the opening is mounted to the opening of the enclosure 13. The light transmitting-cover is provided with a number of segment lenses 31, as shown in FIGS. 4 and 5 which are integrally made of transparent resin or glass such as acrylic resin, vinyl chloride, polycarbonate, polystyrene and the like. The lens segments are two-dimensionally arranged with their optical axes aligned substantially parallel and with the same configuration and size. Each segment lens 31 has a pair of spheroidal convex surfaces (e.g. spherical surfaces) 33A and 33B for defining segment lens elements respectively, which are oppositely curved, have a rectangular front shape and a common optical axis 32. The thickness D of each lens segment 31, i.e. a distance along the optical axis between the pair of the convex surfaces 33A and 33B, is substantially equal to a focal length of each of the convex surfaces 33A and 33B which depends on the material of the lens segment lenses 31. For example, the pairs of the convex surfaces 33A and 33B are formed with the same size and the same configuration, and made of acrylic resin with the refractive index of approximately 1.49. In this case, the thickness D is selected 2.3 to 3.0 R for the radius R of the sphere.

With such a structure, if the electrical power is fed to the light source 15, then the light source 15 lights up to emit light rays which travel to reach the light transmitting-cover 12 directly or from the mirror 14. The light rays transmitted through the light transmitting-cover 12 are projected onto a certain surface. In this case, since the light transmitting-cover 12 has the above-mentioned structure, the efficiency of the light can be improved, and if the light source has the poor luminance distribution and the poor color balance, the uniform luminance distribution and good color balance are obtained over the entire surface of the cover 12. Accordingly, a high quality illumination with the uniform light distribution and good color balance can be attained.

Figure 6:
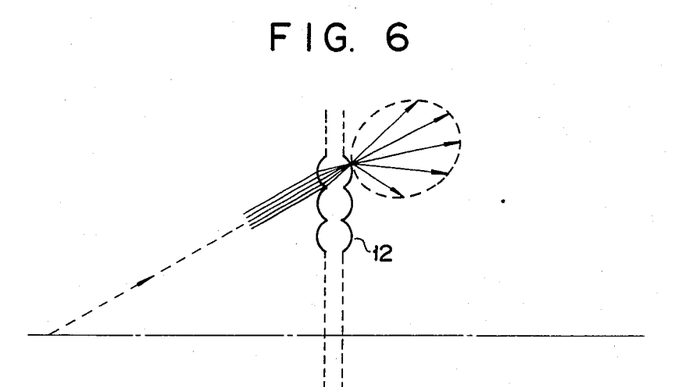
FIG. 6 shows a distribution of light rays passing through the light transmitting-cover shown in FIG. 4.
Figure 7A:
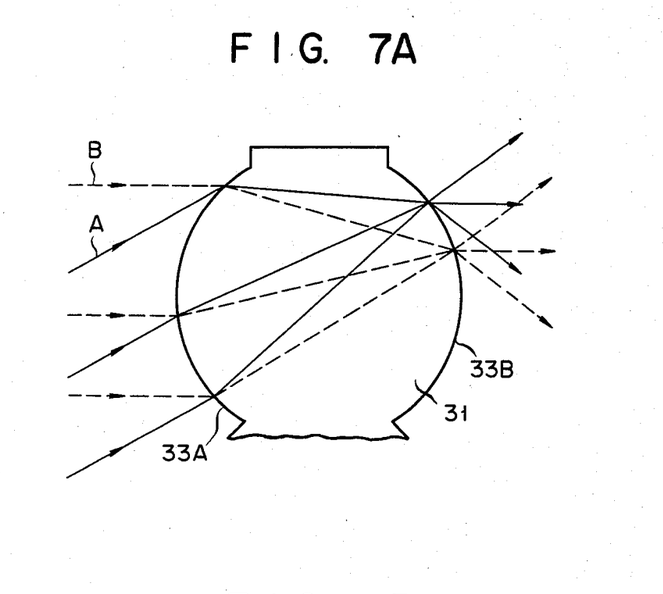
FIGS. 7A and 7B show lens segments on the peripheral and the central portions of the light transmitting-cover and optical paths of the light rays passing through the segments.
Figure 7B:
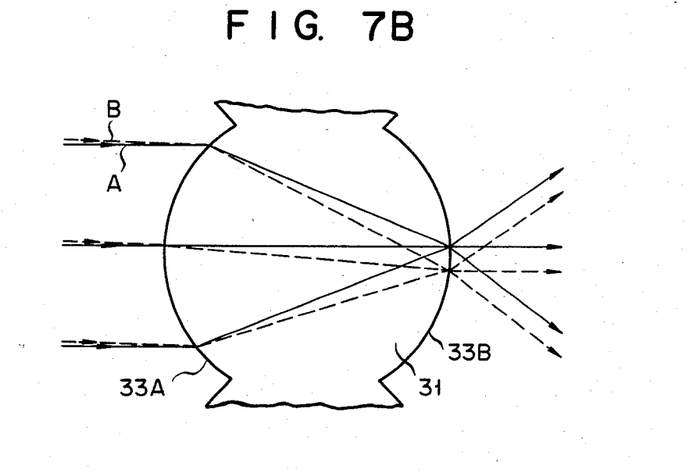
Figure 8:
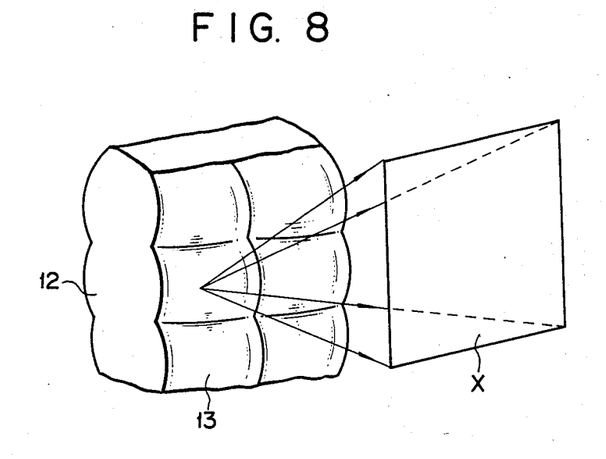
FIG. 8 shows a perspective view of a configuration of a light distribution of the light rays projected from one lens segment of the light transmitting-cover shown in FIG. 4.

To be more specific, the segment lens 31 of the light transmitting-cover 12 has a cross section as shown in FIG. 5. When light rays A and B are incident upon the convex surfaces 33A of the lens 31 at different angles as indicated by solid and broken lines as shown, the light rays A and B are refracted in and transmitted through the segment lens 31. As described above, the convex surface 33A is located substantially at a focal point of the convex surface 33B, while the convex surface 33B is located substantially at a focal point of the convex surface 33A. Accordingly, two types of the light rays A and B incident at different angles are emitted from the convex surface 33B of the segment lens 31 at substantially equal spread angles. The center line of the light rays emitted is not coincident with the direction in which the light ray are incident on the light transmitting-cover 12 but is parallel with the optical axis of the segment lens 31. This is also true of the light rays incident on any segment lenses 31. Thus, even if the directions of the incident light rays are different, the light rays are emitted from the segments lenses at substantially fixed spread angles with the center line substantially parallel with the optical axis of the segment lens 31, as shown in FIG. 6. In other words, the light rays are so projected from the light transmitting-cover 12 as to direct the center line of the light rays in a direction perpendicular to the light transmitting-cover 12. In this way, the light rays directly emitted or reflected from the reflecting mirror 14 are projected substantially in parallel. In FIG. 7 illustrating this state, FIG. 7A shows the optical paths of the light rays passing through the segment lens located at the peripheral portion of the light refracting cover 12 and FIG. 7B shows the optical paths of the light rays passing through the segment lens 31 located at the central portion of the cover. The light rays emitted from the light source 15 and directly incident on the cover 12 are indicated by solid lines A, while the light rays emitted from the light source and reflected from the reflecting mirror 14 toward the cover 12 are indicated by broken lines B. Thus, when the light rays from the light source travel in different directions, the light rays A and B are projected in the direction having the same spread angle. Therefore, the light rays are uniformly distributed over the illuminated surface. As seen from the above description, the light rays with different incident directions are projected at a fixed spread angle and the distribution of the light rays is symmetrical with respect to the direction substantially normal to the light transmitting-cover 12. Accordingly, at any portion of the transmitting-cover 12, the light is most intensive in a direction substantially vertical to the surface of the optical refractor 12. This indicates that the incident light rays are effectively directed toward the illuminated surface, resulting in effective distribution of the light rays and improvement of the illuminance distribution on the illuminated surface. Further, if the light source 15 has partially a poor luminance distribution or poor color uniformity and the light rays from such light source are incident on the optical refractor in different directions, the spread angles and the direction of center rays of the light rays emitted from the segment lenses are substantially equal and parallel, respectively. As a result, uniform luminance distribution and good color balance are obtained on the illuminated surface. Furthermore, a configuration of the light distribution of the light rays projected from the light transmitting-cover 12 can properly be adjusted by the cover 12. For example, the front shape of the segment lens is a rectangular and the material of the light transmitting-cover has a refractive index of 1.49. The width of each convex surface 33A and 33B or the horizontal pitch Ph of the lens segments, is set at 1.6 R where R is the radius of the segment lens and the height of the lens, or the vertical pitch Pb of the lenses, is set at 0.8 R. With this physical arrangement, a configuration of the light distribution resembles a quadrangular pyramid with the horizontal spread angle about ±30° and the vertical spread angle about ±13°. The horizontal and vertical spread angles can be changed by properly changing the horizontal and vertical pitches Ph and Pb. If the convex surfaces 33A and 33B are rectangular as viewed in the front side, the illuminated surface X is also rectangular, as shown in FIG. 8. A ratio of the vertical to horizontal sides in the rectangular illuminated surface can properly be changed by properly selecting the vertical and horizontal pitches Pb and Ph of the segment lens 31.

Figure 9A:
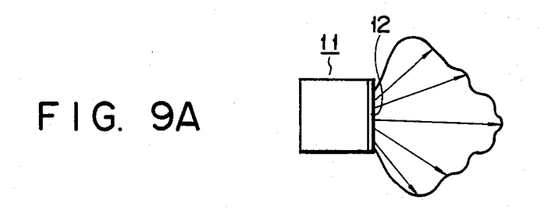
FIGS. 9A and 9B show light distributions of the light rays formed by the prior lighting apparatus and the lighting apparatus of the present invention.
Figure 9B:
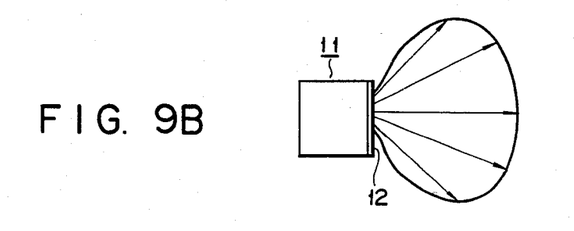
Figure 10A:
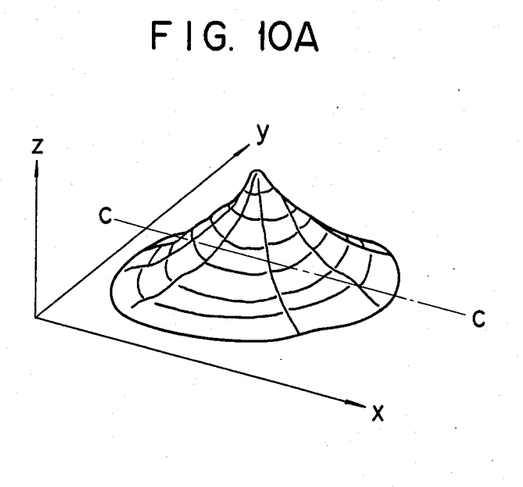
FIGS. 10A and 10B show three dimensional configuration of the light distributions formed on the illuminated surface by the lighting apparatuses shown in FIGS. 9A and 9B.
Figure 10B:
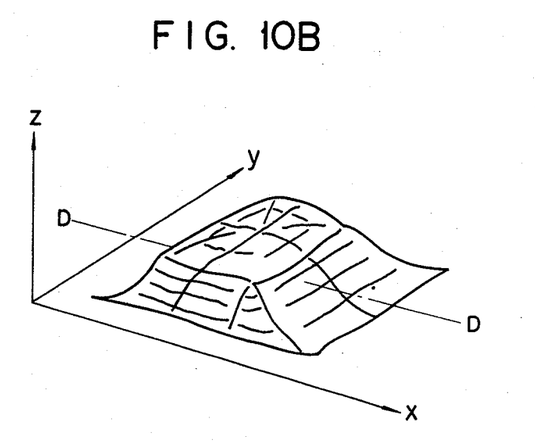
Figure 11A:
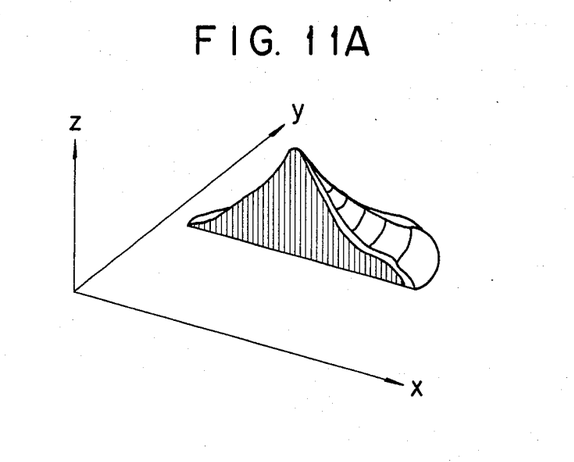
FIGS. 11A and 11B show cross sectional views, taken on line C—C in FIG. 10A and line D—D in FIG. 10B.
Figure 11B:
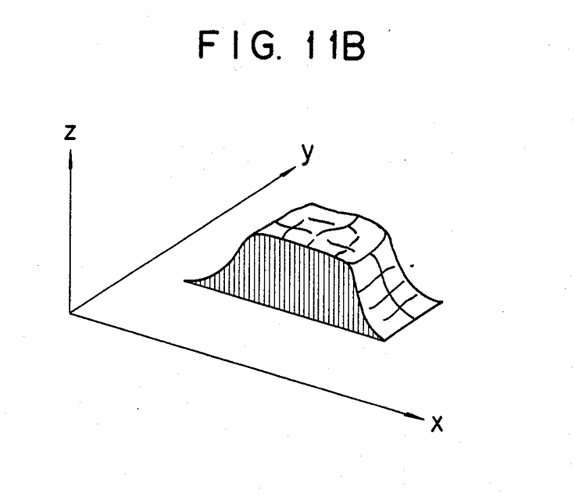

FIGS. 9A and 9B show light distribution characteristics of a lighting apparatus provided with a light source which has a poor intensity distribution; FIG. 9A shows the characteristic of the prior art and FIG. 9B shows the characteristic of the lighting apparatus according to the present invention. FIGS. 10A and 10B show three-dimensional configuration of illumination distribution when the illuminated surface is placed on an XY plane and the light intensity is represented by the z axis. FIG. 10A shows the configuration of the illumination distribution of the prior art and FIG. 10B shows that of the present invention. FIG. 11A shows a cross sectional view taken along a line C—C in FIG. 10A and FIG. 11B show a cross sectional view taken along a line D—D in FIG. 10B. As seen from these figures, according to the present invention, the illuminated surface can be illustrated substantially uniformly.

Figure 12:
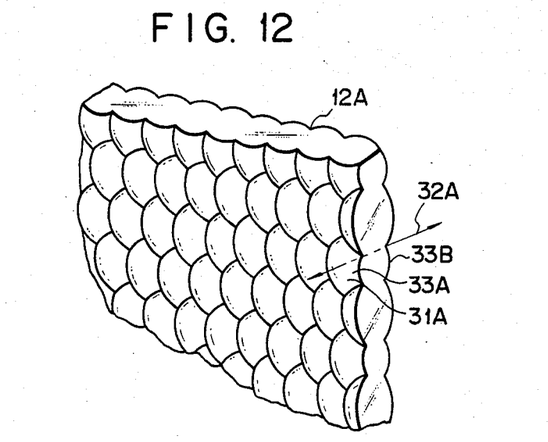
FIGS. 12 and 13 show perspective views of light transmitting-covers assembled into other embodiments of a lighting apparatus according to the present invention.
Figure 13:
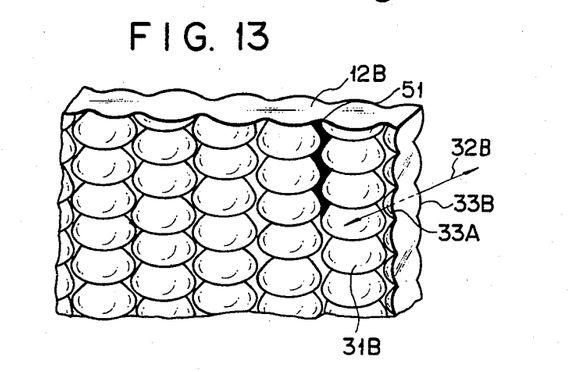
Figure 14:
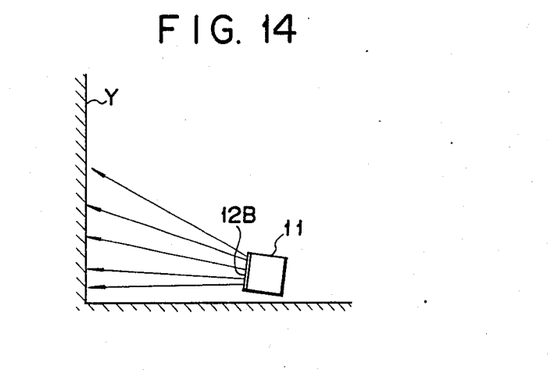
FIG. 14 illustrates how the lighting apparatus using the light transmission cover shown in FIG. 13 is used.

The present invention may variously be modified and changed within the scope of the present invention. As shown in FIG. 12, a light transmitting-cover 12 has a number of two-dimensionally arranged segment lenses 31A each of which is hexagonal as viewed in the front and rear sides. The segment lens 31A shown in FIG. 12 has a pair of convex surfaces 33A and 33B defining segment lens elements and having a common optical axis 32A. The convex surface 33A is located at the focal point of the convex surface 33B and vice versa. A light transmitting cover 12B, as shown in FIG. 13, has a number of segment lenses 31B each of which is trapezoidal as viewed in the front side. The segment lenses 31B each have a pair of convex surfaces 33A and 33B having a common optical axis 32B. One of the surfaces is located at the focal point of the other and vice versa. In the case of the segment lens having a rectangular shape of its front side view, a configuration of the distribution of the light rays resembles a hexagonal pyramid symmetrical with respect to the vertical and horizontal axes. The illuminated surface is substantially hexagonal. In the segment lens of which the front view is trapezoidal, the configuration of the distribution of the light rays is shaped like a trapezoidal pyramid, and the illuminated surface is trapezoidal. A plane Y, as shown in FIG. 14, is obliquely illuminated through the light transmitting-cover 12B shown in FIG. 13, since the light transmitting-cover 12B has the configuration of the distribution of the light rays resembling to the trapezoidal pyramid, the plane Y has a rectangular or square, uniform illumination area. The light transmitting-cover 12B is useful for a case where the location for the lighting apparatus is limited and the illumination area must be rectangular or square. If the segment lens of the light transmitting-cover is specially configured like a trapezoidal figure, as shown in FIG. 13, the convex surfaces 33A and 33B of the segment lenses can not be arranged in a high density on a plane, so that there are plane portions among the convex surfaces. Accordingly, the light rays straightly pass through the boundary portions among the segment lens, without being converged or diverged, thereby to possibly form the poor light distribution or color balance. To remove the undesired light rays, the portions other than the segment lens 31B located closer to the light source 15, or the boundary portions among the segment lens, are deposited or coated with light reflecting material, thereby to form reflecting regions 51. The provision of the reflecting regions 51 in the boundary portions among the segment lens 31B does not influence the light rays passing through the lens segments 31B. The light rays which impinges on and reflects from the reflecting region 51 are directed to the mirror 14, and then travel toward the optical refractor again and are projected through the segment lenses 31B to the illuminated surface. Therefore, the light rays emitted from the light source are effectively used. The shape of the front view of the lens segment may be circular or oval in addition to the shapes shown in FIGS. 12 and 13.

Additionally, the optical refractor may be subjected to a light diffusing treatment. This implies that not only completely transparent material but also light diffusion material may be used for the optical refractor. A light diffusing plate with a weak light diffusion may be disposed integral with the light emitting surface of the optical refractor. Further, this device can be used as a display plate.

As described above, according to the present invention, even if the light source having a poor luminance distribution or poor color uniformity or a plurality of the light sources are used, an area can be effectively illuminated at uniform distribution and good color uniformity. Further, the configuration of the light rays distribution can be selected properly.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lighting apparatus having a first light transmitting-cover through which light rays are projected, said first light transmitting-cover comprising:
   a plate of light transmitting-material having a first and second surfaces;
   a plurality of first segment lens elements of a same size and a same shape, integrally formed with the plate and arranged on the first surface of the plate; and
   a plurality of second segment lens elements of a same size and a same shape, integrally formed with the plate and arranged on the second surface of the plate in face-to-face relation with the plurality of first segment lens elements, respectively, thereby forming a plurality of segment lenses, wherein the first and second segment lens elements of each pair have a common optical axis and convex surfaces and have substantially equal focal lengths so that a focal point of the first segment lens element lies on a convex surface of the second segment lens element and a focal point of the second segment lens element lies on a convex surface of the first segment lens element.

2. The lighting apparatus according to claim 1, wherein each of said first and second segment lens elements further comprises a spheroidal convex surface.

3. The lighting apparatus according to claim 1, wherein each of said first and second segment lens elements further comprises a substantially polygonal shape.

4. The lighting apparatus according to claim 1, wherein each of said first and second segment lens elements further comprises a substantially trapezoidal shape.

5. The lighting apparatus according to claim 1, wherein each of said first and second segment lens elements further comprises a substantially hexagonal shape.

6. The lighting apparatus according to claim 1, wherein each of said first and second segment lens elements further comprises an elongated cylindrical convex surface.

7. The lighting apparatus according to claim 1, wherein said plate is made of a transparent material.

8. The lighting apparatus according to claim 1, wherein said plate is made of a semi-transparent material.

9. The lighting apparatus according to claim 1, wherein said second segment lens element from which light rays are projected, is covered with a light diffusing layer.

10. The lighting apparatus according to claim 6, wherein said first and second segment lens elements are contacted each other.

11. The lighting apparatus according to claim 6, wherein said first and second segment lens elements are so arranged that the convex surfaces of the first and second segment lens elements are elongated in different directions.

12. The lighting apparatus according to claim 1, further comprising a plurality of light reflecting regions, each of which is arranged between adjacent first segments regions.

* * * * *